US011863303B2

(12) United States Patent
Wang

(10) Patent No.: US 11,863,303 B2
(45) Date of Patent: Jan. 2, 2024

(54) LINK BIT ERROR-BASED PROCESSING METHOD AND APPARATUS

(71) Applicant: HUAWEI TECHNOLOGIES CO., LTD., Guangdong (CN)

(72) Inventor: Jiuming Wang, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 84 days.

(21) Appl. No.: 17/541,052

(22) Filed: Dec. 2, 2021

(65) Prior Publication Data

US 2022/0094486 A1 Mar. 24, 2022

Related U.S. Application Data

(63) Continuation of application No. PCT/CN2020/093625, filed on May 30, 2020.

(30) Foreign Application Priority Data

Jun. 3, 2019 (CN) .......................... 201910476860.5

(51) Int. Cl.
*H04L 45/00* (2022.01)
*H04L 1/20* (2006.01)
(Continued)

(52) U.S. Cl.
CPC ............. *H04L 1/203* (2013.01); *H04L 45/04* (2013.01); *H04L 45/22* (2013.01); *H04L 45/28* (2013.01)

(58) Field of Classification Search
None
See application file for complete search history.

(56) References Cited

U.S. PATENT DOCUMENTS 10,148,517 B2 * 12/2018 Venkataswami ........ H04L 45/04
10,778,724 B1 * 9/2020 Miriyala ............. H04L 63/0245
(Continued)

FOREIGN PATENT DOCUMENTS

CN 103023776 A 4/2013
CN 103874159 A 6/2014
(Continued)

OTHER PUBLICATIONS

T. Li et al. IS-IS Extensions for Traffic Engineering, rfc5305, Oct. 2008. total 17 pages.
(Continued)

*Primary Examiner* — Abdelillah Elmejjarmi
(74) *Attorney, Agent, or Firm* — WOMBLE BOND DICKINSON (US) LLP

(57) ABSTRACT

This application describes a link bit error-based processing method and apparatus. A network device may report, to a controller, a bit error rate at which an egress port on the network device is configured to send data traffic. In this way, the controller may collect and accumulate bit error rates at which data traffic is sent through all egress ports on a transmission path, to obtain an accumulated bit error rate of the transmission path. In this way, the controller may determine, based on the accumulated bit error rate of the transmission path, whether to switch a service flow on the transmission path to another transmission path. Therefore, the controller may switch a service flow transmitted on a transmission path with an excessively high accumulated bit error rate to another transmission path with a relatively low accumulated bit error rate for transmission.

19 Claims, 6 Drawing Sheets

(51) Int. Cl.
*H04L 45/02* (2022.01)
*H04L 45/28* (2022.01)

(56) References Cited

U.S. PATENT DOCUMENTS

| | | | |
|---|---|---|---|
| 2003/0091001 A1 | 5/2003 | Watanabe | |
| 2006/0053352 A1* | 3/2006 | Juncker | H04L 1/201 714/704 |
| 2015/0023202 A1 | 1/2015 | Shattil | |
| 2017/0289027 A1* | 10/2017 | Ratnasingham | H04L 45/507 |
| 2017/0302504 A1* | 10/2017 | Wang | H04L 45/02 |
| 2017/0302570 A1 | 10/2017 | Liu | |
| 2018/0219618 A1 | 8/2018 | Paraschis et al. | |
| 2018/0220210 A1 | 8/2018 | Paraschis et al. | |

FOREIGN PATENT DOCUMENTS

| | | |
|---|---|---|
| CN | 104104601 A | 10/2014 |
| CN | 104579770 A | 4/2015 |
| CN | 105827419 A | 8/2016 |
| CN | 106856453 A | 6/2017 |
| CN | 109150761 A | 1/2019 |
| CN | 109547279 A | 3/2019 |
| EP | 3232616 A1 | 10/2017 |
| EP | 3687114 A1 | 7/2020 |
| JP | 2003152786 A | 5/2003 |
| JP | 2013098706 A | 5/2013 |
| JP | 2018504832 A | 2/2018 |
| WO | 2019057211 A1 | 3/2019 |

OTHER PUBLICATIONS

H. Gredler et al, North-Bound Distribution of Link-State and Traffic Engineering (TE) Information Using BGP. RFC7752, Mar. 2016, 48 pages.

A. Lindem, Ed. et al, RFC7770, Extensions to OSPF for Advertising Optional Router Capabilities, Internet Engineering Task Force (IETF), Feb. 2016, 15 pages.

* cited by examiner

| Sub-TLV type | Length (octets) | Name |
|---|---|---|
| 19 | 4 | Bit-error detect |

FIG. 3

| TLV code point | Length (octets) | Name |
|---|---|---|
| 32768 | 4 | Bit-error detection |

FIG. 4

| TLV code point | Description | IS-IS TLV /Sub-TLV | Reference (RFC/Section) |
|---|---|---|---|
| 266 | Bit-error detection | 22/19 | |

FIG. 5

LINK BIT ERROR-BASED PROCESSING METHOD AND APPARATUS

CROSS-REFERENCE TO RELATED APPLICATIONS

This application is a continuation of International Application No. PCT/CN2020/093625, filed on May 30, 2020, which claims priority to Chinese Patent Application No. 201910476860.5, filed on Jun. 3, 2019. The disclosures of the aforementioned applications are hereby incorporated by reference in their entireties.

TECHNICAL FIELD

This application relates to the field of communications technologies, and in particular, to a link bit error-based processing method and apparatus.

BACKGROUND

When a physical link between communications devices encounters a line problem, for example, optical cable aging, line damage, or poor laser contact, a bit error usually occurs for a signal transmitted on the physical link at a receiving moment compared with a sending moment. This bit error is referred to as a link bit error. Severe link bit errors may cause severe problems, for example, a base station stops a service or reduces a service level. Therefore, link bit errors on a network need to be detected, to avoid forwarding a service flow on a physical link with a severe bit error.

In many scenarios, a transmission path of a service flow may be a multi-hop path including a plurality of physical links. In this case, there is usually the following situation: Although a bit error of each physical link on the transmission path of the service flow is at an acceptable level, a severe bit error occurs after the service flow traverses the multi-hop transmission path.

SUMMARY

Based on this, embodiments of this application provide a link bit error-based processing method and apparatus, to accumulate bit error rates of all egress ports on a multi-hop path, so as to avoid transmitting a service flow on a multi-hop path with a severe accumulated bit error rate.

According to a first aspect, an embodiment of this application provides a link bit error-based processing method. According to the method, the controller receives first link status information sent by a first network device, determines a first accumulated bit error rate of a first transmission path based on the first link status information, and switches a service flow from the first transmission path to a second transmission path when determining that the first accumulated bit error rate is greater than a first bit error rate threshold. The first link status information includes first egress port information and a first bit error rate, the first egress port information indicates a first egress port of the first network device, the first network device is configured to send data traffic to a next-hop network device of the first network device along the first transmission path through the first egress port, and the first bit error rate indicates a bit error rate at which data traffic is sent through the first egress port. The first accumulated bit error rate is a weighted sum of bit error rates of all egress ports configured to send data traffic on the first transmission path. A head node network device of the first transmission path and a head node network device of the second transmission path are a same network device, and a tail node network device of the first transmission path and a tail node network device of the second transmission path are a same network device. It can be learned that the controller may collect, in a manner of reporting by a network device, bit error rates at which data traffic is sent through all egress ports on the first transmission path, and accumulate the bit error rates, to obtain the accumulated bit error rate of the first transmission path. In this way, the controller may determine, based on the accumulated bit error rate of the first transmission path, whether to switch the service flow on the first transmission path to the second transmission path. Therefore, the controller may switch a service flow transmitted on a transmission path with an excessively high accumulated bit error rate to another transmission path with a relatively low accumulated bit error rate for transmission. This can avoid using a multi-hop path with a severe accumulated bit error rate to forward a service flow, and improve transmission stability of the service flow.

With reference to any embodiment of the first aspect, in a first possible embodiment of the first aspect, that the controller determines a first accumulated bit error rate of the first transmission path based on the first link status information includes: The controller clears a value of the first bit error rate to zero when the first bit error rate is less than the second bit error rate threshold, where the first bit error rate threshold is greater than the second bit error rate threshold. It can be learned that if the first bit error rate that is of the first egress port and that is reported by the first network device is excessively low, the controller may ignore the bit error rate of the first egress port, thereby reducing a bit error rate that is of an egress port and that is to be processed by the controller, and reducing processing load of the controller.

With reference to any embodiment of the first aspect, in a second possible embodiment of the first aspect, the method further includes: The controller receives second link status information sent by a second network device, determines a second accumulated bit error rate of the second transmission path based on the second link status information, and switches the service flow from the first transmission path to the second transmission path when determining that the first accumulated bit error rate is greater than the first bit error rate threshold and the second accumulated bit error rate is less than the first bit error rate threshold. The second link status information includes second egress port information and a second bit error rate, the second egress port information indicates a second egress port of the second network device, the second network device is configured to send data traffic to a next-hop network device of the second network device along the second transmission path through the second egress port, the second bit error rate indicates a bit error rate at which data traffic is sent through the second egress port, and the second accumulated bit error rate is a weighted sum of bit error rates of all egress ports configured to send data traffic on the second transmission path. It can be learned that the controller may switch the service flow from the first transmission path to the second transmission path when determining that the accumulated bit error rate of the first transmission path is excessively high and the accumulated bit error rate of the second transmission path is relatively low. This can avoid using a multi-hop path with a severe accumulated bit error rate to forward a service flow, and improve transmission stability of the service flow.

With reference to any embodiment of the first aspect, in a third possible embodiment of the first aspect, before the controller switches a service flow from the first transmission path to a second transmission path, the method further includes: The controller obtains another transmission path between the head node network device of the first transmission path and the tail node network device of the first transmission path that is different from the first transmission path, and determines the second transmission path from the another transmission path based on an accumulated bit error rate of each of the another transmission path. It can be learned that when the accumulated bit error rate of the first transmission path is excessively high, the controller may select, based on the accumulated bit error rate, a second transmission path used to switch the service flow from a plurality of other transmission paths that have a same head node and a same tail node as the first transmission path. In this way, not only the service flow can be switched to a transmission path with a more appropriate accumulated bit error rate, but also data traffic carried by the transmission paths can be more balanced.

With reference to any embodiment of the first aspect, in a fourth possible embodiment of the first aspect, the method further includes: After the controller switches a service flow from the first transmission path to a second transmission path, the controller receives third link status information sent by a third network device, determines a third accumulated bit error rate of the first transmission path based on the third link status information, and switches the service flow from the second transmission path back to the first transmission path when the controller determines that the third accumulated bit error rate is less than the first bit error rate threshold. The third link status information includes third egress port information and a third bit error rate, the third egress port information indicates a third egress port of the third network device, the third network device is configured to send data traffic to a next-hop network device of the third network device along the first transmission path through the third egress port, the third bit error rate indicates a bit error rate at which data traffic is sent through the third egress port, and the third accumulated bit error rate is a weighted sum of bit error rates of all the egress ports configured to send data traffic on the first transmission path. It can be learned that after the service flow is switched to the second transmission path, when the accumulated bit error rate of the first transmission path decreases to an acceptable degree, the controller may further switch the service flow from the second transmission path back to the first transmission path that is more suitable for transmitting the service flow. In this way, the service flow can be transmitted on a more suitable transmission path.

With reference to any embodiment of the first aspect, in a fifth possible embodiment of the first aspect, that the controller receives first link status information sent by a first network device includes: The controller receives a border gateway protocol (BGP) update packet, where the BGP update packet carries the first link status information sent by the first network device; and the controller obtains the first link status information from the BGP update packet. It can be learned that the first bit error rate of the first egress port configured to send the data traffic may be carried in a BGP update packet and reported to the controller.

With reference to the fifth possible embodiment of the first aspect, in a sixth possible embodiment of the first aspect, the first link status information is specifically carried in a multiprotocol reachable network layer reachability information (MP REACH NLRI) field or a multiprotocol unreachable network layer reachability information (MP UNREACH NLRI) field in the BGP update packet. It can be learned that the first bit error rate of the first egress port configured to send the data traffic may be carried in the network layer reachability information (NLRI) field and reported to the controller.

With reference to the fifth possible embodiment or the sixth possible embodiment of the first aspect, in a seventh possible embodiment of the first aspect, the first link status information in the BGP update packet is carried in type-length-value (TLV) information. It can be learned that the first bit error rate of the first egress port configured to send the data traffic may be carried in the TLV information and reported to the controller.

With reference to any embodiment of the first aspect, in an eighth possible embodiment of the first aspect, the first link status information is directly sent by the first network device to the controller; or the first link status information is first sent by the first network device to a fourth network device, and then is directly sent by the fourth network device to the controller. It can be learned that the first network device may directly or indirectly report, to the controller, the first bit error rate of the first egress port configured to send the data traffic.

With reference to any embodiment of the first aspect, in an eighth possible embodiment of the first aspect, the first bit error rate threshold is specifically a bit error rate threshold that is set corresponding to a service type of the service flow. It can be learned that because bit error rate critical values at which service flows of different service types are affected are different, the controller may determine, for the service flows of the different service types by using different bit error rate thresholds, whether an accumulated bit error rate of a transmission path is excessively high, to determine whether to switch the transmission path of a service flow. Therefore, transmission paths of the service flows of the different service types can be switched when the service flows of the different service types are affected.

According to a second aspect, an embodiment of this application provides a link bit error-based processing method. According to the method, a first network device detects a first bit error rate at which data traffic is sent through a first egress port and sends first link status information to a controller. The first network device is configured to send data traffic to a next-hop network device of the first network device along a first transmission path through the first egress port, and the first link status information includes first egress port information and the first bit error rate, and the first egress port information is used to indicate the first egress port. The first link status information is used to determine a first accumulated bit error rate of the first transmission path, the first accumulated bit error rate is a weighted sum of bit error rates of all egress ports configured to send data traffic on the first transmission path, the first accumulated bit error rate is used to determine whether to switch a service flow from the first transmission path to a second transmission path, a head node network device of the first transmission path and a head node network device of the second transmission path are a same network device, and a tail node network device of the first transmission path and a tail node network device of the second transmission path are a same network device. It can be learned that a network device may report, to the controller, a bit error rate at which an egress port is configured to send data traffic. In this way, the controller may collect and accumulate bit error rates at which data traffic is sent through all egress ports on a transmission path, to obtain an accumulated bit error rate of the transmission path. Therefore, the controller may switch a service flow transmitted on a transmission path with an excessively high accumulated bit error rate to another transmission path with a relatively low accumulated bit error rate for transmission. This can avoid using a multi-hop path with a severe accumulated bit error rate to forward a service flow, and improve transmission stability of the service flow.

With reference to any embodiment of the second aspect, in a first possible embodiment of the second aspect, the first link status information is sent to the controller by using a BGP update packet. The first bit error rate of the first egress port configured to send the data traffic may be carried in a BGP update packet and reported to the controller.

With reference to the first possible embodiment of the second aspect, in a second possible embodiment of the second aspect, the first link status information is specifically carried in a multiprotocol reachable network layer reachability information (MP REACH NLRI) field or a multiprotocol unreachable network layer reachability information (MP UNREACH NLRI) field in the BGP update packet. It can be learned that the first bit error rate of the first egress port configured to send the data traffic may be carried in the NLRI field and reported to the controller.

With reference to the first possible embodiment or the second possible embodiment of the second aspect, in a third possible embodiment of the second aspect, the first link status information in the BGP update packet is carried in type-length-value TLV information. It can be learned that the first bit error rate of the first egress port configured to send the data traffic may be carried in the TLV information and reported to the controller.

With reference to any embodiment of the second aspect, in a fourth possible embodiment of the second aspect, the first link status information is directly sent by the first network device to the controller. It can be learned that the first network device may directly report, to the controller, the first bit error rate of the first egress port configured to send the data traffic.

With reference to the fourth possible embodiment of the second aspect, in a fifth possible embodiment of the second aspect, the method further includes: The first network device receives second link status information sent by a second network device and sends the second link status information to the controller. The second link status information includes second egress port information and a second bit error rate, the second egress port information indicates a second egress port of the second network device, the second network device is configured to send data traffic to a next-hop network device of the second network device along a third transmission path through the second egress port, and the second bit error rate indicates a bit error rate at which data traffic is sent through the second egress port. The second link status information is used to determine a second accumulated bit error rate of the third transmission path, where the second accumulated bit error rate is a weighted sum of bit error rates of all egress ports configured to send data traffic on the third transmission path, the second accumulated bit error rate is used to determine whether to switch a service flow from the third transmission path to a fourth transmission path, a head node network device of the third transmission path and a head node network device of the fourth transmission path are a same network device, and a tail node network device of the third transmission path and a tail node network device of the fourth transmission path are a same network device. It can be learned that the second network device may indirectly report, to the controller by using the first network device, the second bit error rate of the second egress port configured to send the data traffic.

With reference to any embodiment of the second aspect, in a sixth possible embodiment of the second aspect, the first link status information is first sent by the first network device to a third network device, and then is directly sent by the third network device to the controller. It can be learned that the first network device may indirectly report, to the controller by using the third network device, the first bit error rate of the first egress port configured to send the data traffic.

According to a third aspect, an embodiment of this application provides a link bit error-based processing apparatus. The apparatus is a controller, and includes a receiving unit and a processing unit. The receiving unit is configured to receive first link status information sent by a first network device. The first link status information includes first egress port information and a first bit error rate, the first egress port information indicates a first egress port of the first network device, the first network device is configured to send data traffic to a next-hop network device of the first network device along a first transmission path through the first egress port, and the first bit error rate indicates a bit error rate at which data traffic is sent through the first egress port. The processing unit is configured to: determine a first accumulated bit error rate of the first transmission path based on the first link status information, determine whether the first accumulated bit error rate is greater than a first bit error rate threshold, and switch a service flow from the first transmission path to a second transmission path when determining that the first accumulated bit error rate is greater than the first bit error rate threshold. The first accumulated bit error rate is a weighted sum of bit error rates of all egress ports configured to send data traffic on the first transmission path, a head node network device of the first transmission path and a head node network device of the second transmission path are a same network device, and a tail node network device of the first transmission path and a tail node network device of the second transmission path are a same network device.

With reference to any embodiment of the third aspect, in a first possible embodiment of the third aspect, the processing unit is further configured to clear a value of the first bit error rate to zero when the first bit error rate is less than second bit error rate threshold. The first bit error rate threshold is greater than the second bit error rate threshold.

With reference to any embodiment of the third aspect, in a second possible embodiment of the third aspect, the receiving unit is further configured to receive second link status information sent by a second network device. The second link status information includes second egress port information and a second bit error rate, the second egress port information indicates a second egress port of the second network device, the second network device is configured to send data traffic to a next-hop network device of the second network device along the second transmission path through the second egress port, and the second bit error rate indicates a bit error rate at which data traffic is sent through the second egress port. The processing unit is further configured to determine a second accumulated bit error rate of the second transmission path based on the second link status information, determine whether the second accumulated bit error rate is less than the first bit error rate threshold, and switch the service flow from the first transmission path to the second transmission path when determining that the first accumulated bit error rate is greater than the first bit error rate threshold and the second accumulated bit error rate is less than the first bit error rate threshold. The second accumulated bit error rate is a weighted sum of bit error rates of all egress ports configured to send data traffic on the second transmission path.

With reference to any embodiment of the third aspect, in a third possible embodiment of the third aspect, the processing unit is further configured to: before switching the service flow from the first transmission path to the second transmission path, obtain another transmission path between the head node network device of the first transmission path and the tail node network device of the first transmission path that is different from the first transmission path, and determine the second transmission path from the another transmission path based on an accumulated bit error rate of each of the another transmission path.

With reference to any embodiment of the third aspect, in a fourth possible embodiment of the third aspect, the receiving unit is further configured to: after the service flow is switched from the first transmission path to the second transmission path, receive third link status information sent by a third network device. The third link status information includes third egress port information and a third bit error rate, the third egress port information indicates a third egress port of the third network device, the third network device is configured to send data traffic to a next-hop network device of the third network device along the first transmission path through the third egress port, and the third bit error rate indicates a bit error rate at which data traffic is sent through the third egress port. The processing unit is further configured to: determine a third accumulated bit error rate of the first transmission path based on the third link status information, determine whether the third accumulated bit error rate is less than the first bit error rate threshold, and switch the service flow from the second transmission path back to the first transmission path when determining that the third accumulated bit error rate is less than the first bit error rate threshold. The third accumulated bit error rate is a weighted sum of bit error rates of all the egress ports configured to send data traffic on the first transmission path.

With reference to any embodiment of the third aspect, in a fifth possible embodiment of the third aspect, the receiving unit is further configured to receive a border gateway protocol (BGP) update packet, where the BGP update packet carries the first link status information sent by the first network device; and the processing unit is further configured to obtain the first link status information from the BGP update packet.

With reference to the fifth possible embodiment of the third aspect, in a sixth possible embodiment of the third aspect, the first link status information is specifically carried in a multiprotocol reachable network layer reachability information (MP REACH NLRI) field or a multiprotocol unreachable network layer reachability information (MP UNREACH NLRI) field in the BGP update packet.

With reference to the fifth possible embodiment or the sixth possible embodiment of the third aspect, in a seventh possible embodiment of the third aspect, the first link status information in the BGP update packet is carried in type-length-value (TLV) information.

With reference to any embodiment of the third aspect, in an eighth possible embodiment of the third aspect, the first link status information is directly sent by the first network device to the controller; or the first link status information is first sent by the first network device to a fourth network device, and then is directly sent by the fourth network device to the controller.

With reference to any embodiment of the third aspect, in an eighth possible embodiment of the third aspect, the first bit error rate threshold is specifically a bit error rate threshold that is set corresponding to a service type of the service flow.

It may be understood that the apparatus provided in the third aspect corresponds to the method provided in the first aspect. Therefore, for technical effects of the embodiments of the third aspect, refer to the descriptions of the embodiments of the first aspect.

According to a fourth aspect, an embodiment of this application provides a link bit error-based processing apparatus. The apparatus is a first network device, and includes a processing unit and a sending unit. The processing unit is configured to detect a first bit error rate at which data traffic is sent through a first egress port. The first network device is configured to send data traffic to a next-hop network device of the first network device along a first transmission path through the first egress port. The sending unit is configured to send first link status information to a controller. The first link status information includes first egress port information and the first bit error rate, and the first egress port information is used to indicate the first egress port. The first link status information is used to determine a first accumulated bit error rate of the first transmission path, the first accumulated bit error rate is a weighted sum of bit error rates of all egress ports configured to send data traffic on the first transmission path, the first accumulated bit error rate is used to determine whether to switch a service flow from the first transmission path to a second transmission path, a head node network device of the first transmission path and a head node network device of the second transmission path are a same network device, and a tail node network device of the first transmission path and a tail node network device of the second transmission path are a same network device.

With reference to any embodiment of the fourth aspect, in a first possible embodiment of the fourth aspect, the first link status information is sent to the controller by using a BGP update packet.

With reference to the first possible embodiment of the fourth aspect, in a second possible embodiment of the fourth aspect, the first link status information is specifically carried in a multiprotocol reachable network layer reachability information (MP REACH NLRI) field or a multiprotocol unreachable network layer reachability information (MP UNREACH NLRI) field in the BGP update packet.

With reference to the first possible embodiment or the second possible embodiment of the fourth aspect, in a third possible embodiment of the fourth aspect, the first link status information in the BGP update packet is carried in type-length-value (TLV) information.

With reference to any embodiment of the fourth aspect, in a fourth possible embodiment of the fourth aspect, the first link status information is directly sent by the first network device to the controller.

With reference to the fourth possible embodiment of the fourth aspect, in a fifth possible embodiment of the second aspect, the apparatus further includes a receiving unit. The receiving unit is configured to receive second link status information sent by a second network device. The second link status information includes second egress port information and a second bit error rate, the second egress port information indicates a second egress port of the second network device, the second network device is configured to send data traffic to a next-hop network device of the second network device along a third transmission path through the second egress port, and the second bit error rate indicates a bit error rate at which data traffic is sent through the second egress port. The sending unit is further configured to send the second link status information to the controller. The second link status information is used to determine a second accumulated bit error rate of the third transmission path, where the second accumulated bit error rate is a weighted sum of bit error rates of all egress ports configured to send data traffic on the third transmission path, the second accumulated bit error rate is used to determine whether to switch a service flow from the third transmission path to a fourth transmission path, a head node network device of the third transmission path and a head node network device of the fourth transmission path are a same network device, and a tail node network device of the third transmission path and a tail node network device of the fourth transmission path are a same network device.

With reference to any embodiment of the fourth aspect, in a sixth possible embodiment of the fourth aspect, the first link status information is first sent by the first network device to a third network device, and then is directly sent by the third network device to the controller.

It may be understood that the apparatus provided in the fourth aspect corresponds to the method provided in the second aspect. Therefore, for technical effects of the embodiments of the fourth aspect, refer to the descriptions of the embodiments of the second aspect.

According to a fifth aspect, an embodiment of this application further provides a controller. The controller includes a processor and a memory. The memory stores instructions. When the processor executes the instructions, the controller is enabled to perform the method according to any embodiment of the first aspect.

According to a sixth aspect, an embodiment of this application further provides a network device. The network device includes a processor and a memory. The memory stores instructions. When the processor executes the instructions, the network device is enabled to perform the method according to any embodiment of the second aspect.

According to a seventh aspect, an embodiment of this application further provides a computer program product. When the computer program product is run on a computer, the computer is enabled to perform the method according to any embodiment of the first aspect or the method according to any embodiment of the second aspect.

According to an eighth aspect, an embodiment of this application further provides a computer-readable storage medium. The computer-readable storage medium stores instructions. When the instructions are run on a computer or a processor, the computer or the processor is enabled to perform the method according to any embodiment of the first aspect or the method according to any embodiment of the second aspect.

BRIEF DESCRIPTION OF DRAWINGS

To describe the technical solutions in embodiments of this application more clearly, the following briefly describes the accompanying drawings for describing the embodiments. It is clear that the accompanying drawings in the following description show merely some embodiments recorded in this application, and a person of ordinary skill in the art may derive other drawings from these accompanying drawings.

FIG. 3 is a schematic diagram of a TLV definition example according to an embodiment of this application;

FIG. 4 is a schematic diagram of a TLV definition example according to an embodiment of this application;

FIG. 5 is a schematic diagram of a TLV definition example according to an embodiment of this application;

DESCRIPTION OF EMBODIMENTS

In many scenarios, a transmission path of a service flow may be a multi-hop path including a plurality of physical links. In this case, there is usually the following situation: Although a bit error of each physical link on the transmission path of the service flow is at an acceptable level, a severe bit error occurs after the service flow traverses the multi-hop transmission path. Consequently, transmission stability of the service flow is affected. For example, a transmission path of a service flow is from a cell site gateway (CSG) to a radio service gateway (RSG) through an aggregation site gateway (ASG). Neither a bit error rate of a physical link between the CSG and the ASG nor a bit error rate of a physical link between the ASG and the RSG affects transmission of the service flow. However, an accumulated bit error rate of the transmission path from the CSG to the RSG affects the transmission of the service flow.

To resolve the foregoing problem, in the embodiments of this application, a network device may report, to a controller, a bit error rate at which the network device sends data traffic along a first transmission path through an egress port of the network device. The bit error rate at which the egress port is configured to send data traffic may be considered as a bit error rate of a physical link between the network device and a next-hop network device of the network device on the first transmission path. In a manner of reporting by the network device, the controller may collect and accumulate bit error rates at which data traffic is sent through all egress ports on the first transmission path, so that the controller may switch a service flow on the first transmission path to a second transmission path when a bit error rate obtained through accumulation is excessively high. Therefore, the controller may switch a service flow transmitted on a transmission path with an excessively high accumulated bit error rate to another transmission path with a relatively low accumulated bit error rate for transmission. This can avoid using a multi-hop path with a severe accumulated bit error rate to forward a service flow, and improve transmission stability of the service flow.

Figure 1:
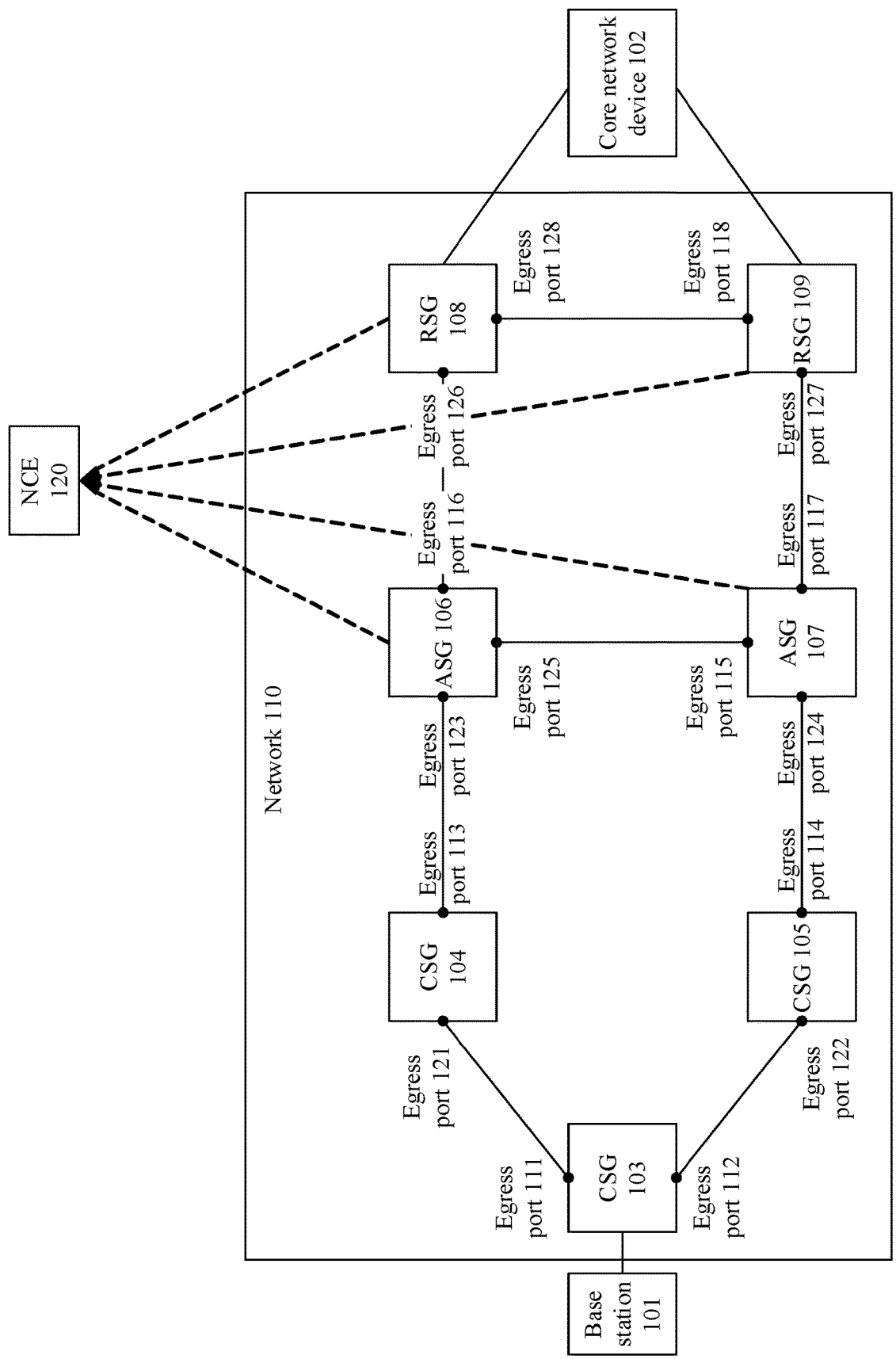
FIG. 1 is a schematic diagram of a framework of a network system in an application scenario according to an embodiment of this application.

For example, one of scenarios of the embodiments of this application may be applied to a network structure shown in FIG. 1. A network 110 that may be configured to transmit a service flow between a base station 101 and a core network device 102 includes network devices such as a cell site gateway (CSG) 103, a CSG 104, a CSG 105, an aggregation site gateway (ASG) 106, an ASG 107, a radio service gateway (RSG) 108, and an RSG 109. The base station 101 may be an evolved NodeB (eNB), a new radio (NR) base station, or the like. The core network device 102 may be a serving gateway (S-GW), a mobility management entity (MME), or the like.

Each network device on the network 110 may report, to a network controller (NCE) 120, a bit error rate at which data traffic is sent through a respective egress port. For example, the ASG 106 may report, to the NCE 120, a bit error rate at which data traffic is sent through an egress port 116. The egress port 116 is used by the ASG 106 to send the data traffic to the RSG 108. For another example, the CSG 104 may report, to the NCE 120 by using the ASG 106, a bit error rate at which data traffic is sent through an egress port 113. The egress port 113 is used by the CSG 104 to send the data traffic to the ASG 106. For another example, the RSG 108 may report, to the NCE 120, a bit error rate at which data traffic is sent through an egress port 128. The egress port 128 is used by the RSG 108 to send the data traffic to the core network device 102.

In a manner of reporting by each network device on the network 110, the NCE 120 may collect and accumulate bit error rates at which all egress ports on a transmission path send data traffic, to obtain an accumulated bit error rate of the transmission path. For example, a first transmission path is a transmission path from the CSG 103 to the RSG 108, and the first transmission path passes through the CSG 103, the CSG 104, the ASG 106, and the RSG 108. The NCE 120 may collect a bit error rate at which an egress port 111 is used by the CSG 103 to send data traffic to the CSG 104, a bit error rate at which the egress port 113 is used by the CSG 104 to send data traffic to the ASG 106, and a bit error rate at which the egress port 116 is used by the ASG 106 to send data traffic to the RSG 108, and accumulate the bit error rates, to obtain an accumulated bit error rate of the first transmission path. When determining that the accumulated bit error rate of the first transmission path is greater than a bit error rate threshold, the NCE 120 may switch a service flow from the first transmission path to a second transmission path. The second transmission path is another transmission path from the CSG 103 to the RSG 108, for example, may be a transmission path that passes through the CSG 103, the CSG 105, the ASG 107, the RSG 109, and the RSG 108.

It may be understood that the foregoing scenario is merely a scenario example provided in this embodiment of this application, and this embodiment of this application is not limited to this scenario.

With reference to the accompanying drawings, the following describes in detail specific implementations of a link bit error-based processing method and apparatus in the embodiments of this application by using the embodiments.

Figure 2:
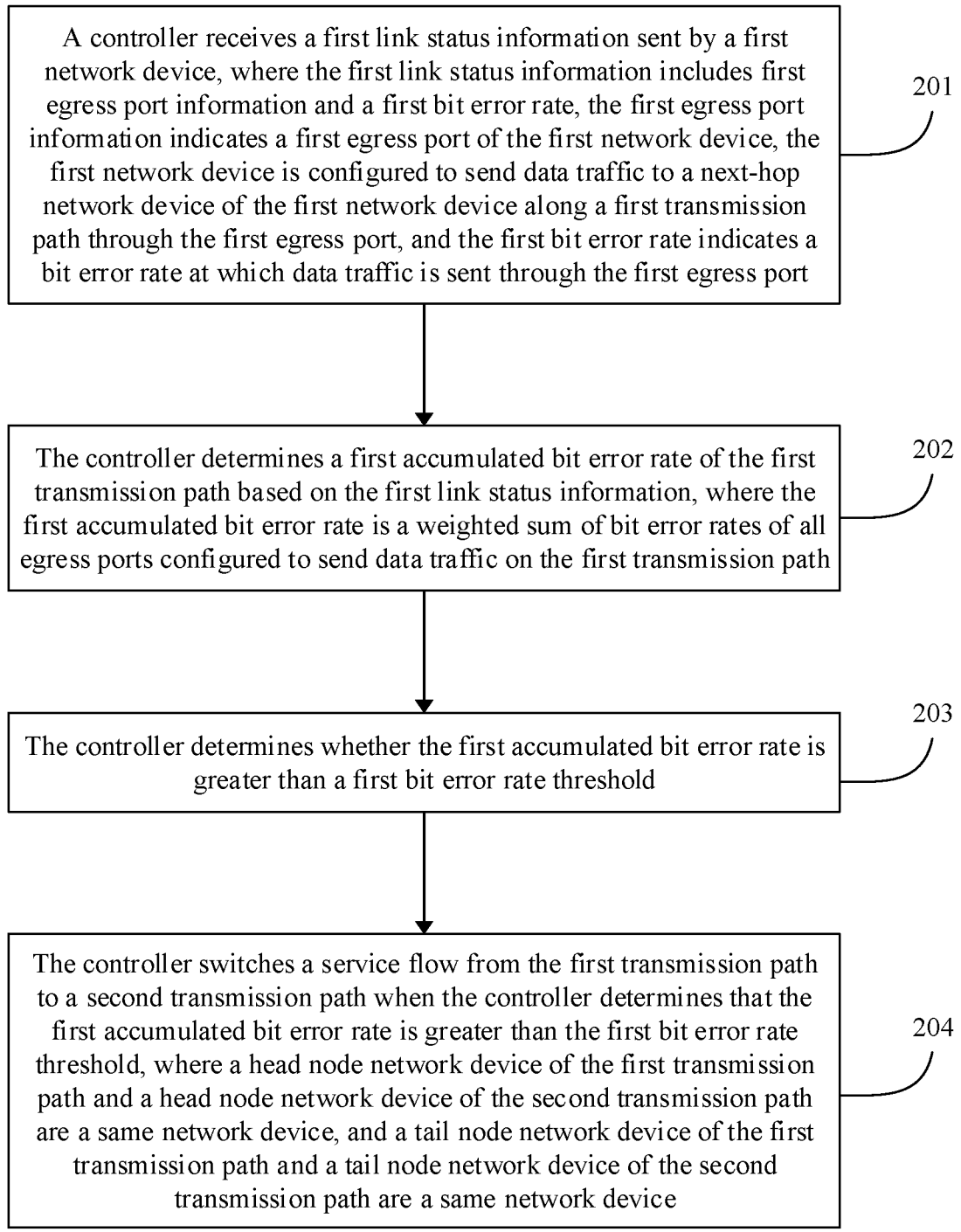
FIG. 2 is a schematic flowchart of a link bit error-based processing method 200 according to an embodiment of this application.

FIG. 2 is a schematic flowchart of a link bit error-based processing method 200 according to an embodiment of this application. The method 200 may include the following steps.

201: A controller receives first link status information sent by a first network device. The first link status information includes first egress port information and a first bit error rate. The first egress port information indicates a first egress port of the first network device, and the first network device is configured to send data traffic to a next-hop network device of the first network device along a first transmission path through the first egress port. The first bit error rate indicates a bit error rate at which data traffic is sent through the first egress port.

In embodiments, the first network device may detect the first bit error rate at which the first network device sends the data traffic to the next-hop network device of the first network device along the first transmission path through the first egress port, generate the first link status information based on the first bit error rate and the first egress port information that is used to indicate the first egress port, and send the first link status information to the controller, to report the first bit error rate to the controller. The first bit error rate may be considered as a bit error rate of a physical link from the first network device to a second network device on the first transmission path, and the first egress port information may be considered as an identifier of the physical link.

It may be understood that, in a manner of reporting link status information by a network device, the controller may receive a bit error rate at which any egress port on any network device is configured to send data traffic. In other words, the first network device may be any network device that is on the network and that is configured to send data traffic. The first egress port may be any egress port on the first network device, and the next-hop network device of the first network device may represent an adjacent network device to which the first network device is connected through the first egress port. For example, in the network structure example shown in FIG. 1, the first network device may be any network device on the network 110. Assuming that the first network device is the ASG 106, the first egress port may be the egress port 116, an egress port 123, or an egress port 125. If the first egress port is 116, the next-hop network device of the first network device is the RSG 108. If the first egress port is 123, the next-hop network device of the first network device is the CSG 104. If the first egress port is 125, the next-hop network device of the first network device is the ASG 107.

The first bit error rate may be determined by performing, by the first network device, bit error detection on a packet received through the first egress port. The first network device determines an error bit in the packet by performing bit error detection on the packet received through the first egress port, and then calculates the first bit error rate based on a quantity of error bits in the packet and a total quantity of bits. For example, the first bit error rate may be a proportion of the quantity of error bits in the total quantity of bits in the packet received by the first network device through the first egress port.

The first network device may detect the error bit in the packet by using an error correction algorithm. For a symbol in the packet received by the first network device through the first egress port, if the symbol can be corrected by using the error correction algorithm, a bit in the symbol is determined as a correct bit. If the symbol cannot be corrected by using the error correction algorithm, a bit in the symbol is determined as a quantity of error bits. The error correction algorithm used to detect an error bit may be, for example, a cyclic redundancy check (CRC) algorithm. Correspondingly, the symbol in the packet received by the first network device through the first egress port may be a CRC code. For example, a CRC code is generated by splicing R check bits after K-bit information. An encoding manner of the CRC code may include: representing to-be-encoded K-bit information as a polynomial M(x), shifting M(x) to the left by R bits to obtain M(x)*xR, dividing M(x)*xR by a generator polynomial G(x) of R+1 bits to obtain a remainder R(x), and performing a modulo 2 addition operation on M(x)*xR and R(x) to obtain the CRC code.

In this embodiment, a plurality of reporting manners may be used by the first network device to report the first link status information to the controller.

In an example, the first network device may communicate with the controller, and the first link status information may be directly sent by the first network device to the controller. For example, in the network structure example shown in FIG. 1, each ASG may communicate with the NCE 120, and each RSG may communicate with the NCE 120. Therefore, an ASG may directly send link status information to the NCE 120, and an RSG may also send link status information to the NCE 120. In other words, if the first network device is an ASG or an RSG, the first link status information may be directly sent by the first network device to the controller.

In another example, the first network device cannot communicate with the controller. In this case, the first link status information may be first sent by the first network device to a fourth network device, and then the fourth network device directly sends the first link status information to the controller. For example, in the network structure example shown in FIG. 1, each CSG cannot communicate with the NCE 120, but each ASG and each RSG may communicate with the NCE 120. Therefore, a CSG may first send link status information to an ASG or an RSG, and then the ASG or the RSG directly sends the link status information to the NCE 120. In other words, if the first network device is a CSG, the first link status information may be first sent by the first network device to the fourth network device, and then directly sent by the fourth network device to the controller. The fourth network device may be an ASG or an RSG.

In still another example, when the first network device can communicate with the controller, the first link status information may alternatively be first sent by the first network device to a fourth network device, and then directly sent by the fourth network device to the controller. For example, in the network structure example shown in FIG. 1, each ASG and each RSG may communicate with the NCE 120. An ASG may first send link status information to an RSG, and then the RSG directly sends the link status information to the NCE 120. In other words, if the first network device is an ASG, the first link status information may be first sent by the first network device to the fourth network device, and then the fourth network device directly sends the first link status information to the controller. The fourth network device may be an RSG.

It may be understood that the controller may use a border gateway protocol (BGP) link state (LS) to receive the first link status information. For example, the first link status information may be carried in a BGP update packet and reported to the controller. In other words, the controller may receive the BGP update packet carrying the first link status information, and read the first link status information from the BGP update packet. For example, the first link status information may be carried in a multiprotocol reachable network layer reachability information (MP REACH NLRI) field or a multiprotocol unreachable network layer reachability information (MP UNREACH NLRI) field in the BGP update packet.

In an example, assuming that the first network device directly sends the first link status information to the controller, the first network device may encapsulate the first link status information into a BGP update packet, and then send the BGP update packet in which the first link status information is encapsulated to the controller.

In another example, assuming that the first network device sends the first link status information to the controller by using the fourth network device, the first network device may send the first link status information to the fourth network device, and the fourth network device encapsulates the first link status information into a BGP update packet, and then sends the BGP update packet to the controller.

It may be understood that the first link status information may be carried in TLV information for transmission. For example, the first network device may use TLV information of the BGP update packet to carry the first link status information, to send the first link status information to the controller. For another example, the first network device may use type-length-value (TLV) information of an interior gateway protocol (IGP) to carry the first link status information, to send the first link status information to the fourth network device, and then the fourth network device uses TLV information of the BGP update packet to carry the first link status information, to send the first link status information to the controller.

In an example, if the IGP protocol is an intermediate system to intermediate system (ISIS) protocol, according to request for comments (RFC) 5305, a link attribute TLV may be added to the ISIS protocol. The link attribute TLV may be used to carry the first link status information, and sent from the first network device to the fourth network device. In a TLV definition example shown in FIG. 3, the link attribute TLV is a sub-TLV, a type is 19, a length is 4 octets, and a name is described as bit-error detection.

In another example, if the IGP protocol is an open shortest path first (OSPF) protocol, according to RFC 7770, a link state advertisement (LSA) TLV may be added to the OSPF protocol. The LSA TLV may be used to carry the first link status information, and sent from the first network device to the fourth network device. In a TLV definition example shown in FIG. 4, in an LSA TLV, a TLV code point is 32768, a length is 4 octets, and a name is described as bit-error detection.

For another example, according to RFC 7752, a link descriptor-related TLV may be added to the BGP LS protocol. The link descriptor-related TLV may be used to carry the first link status information, and sent from the first network device or the fourth network device to the controller. In a TLV definition example shown in FIG. 5, in a link descriptor-related TLV, a TLV code point is 266, a description is bit-error detection, an ISIS TLV is 22, and a sub-TLV is 19.

202: The controller determines a first accumulated bit error rate of the first transmission path based on the first link status information. The first accumulated bit error rate is a weighted sum of bit error rates of all egress ports configured to send data traffic on the first transmission path.

After the controller receives the first link status information, the controller may read the first egress port information and the first bit error rate from the first link status information, and update, based on the first bit error rate, a bit error rate of the first egress port indicated by the first egress port information. In this way, the controller may update the bit error rate of the first egress port to the first bit error rate.

In some embodiments, the controller may determine, based on a size of the first bit error rate, to update the bit error rate of the first egress port to the first bit error rate or clear the bit error rate of the first egress port to zero. In this way, when the first bit error rate is excessively low, the controller may ignore the bit error rate of the first egress port, that is, the first egress port may be considered as free of a bit error. In some embodiments, the controller may determine whether the first bit error rate is less than a second bit error rate threshold. If the first bit error rate is less than the second bit error rate threshold, the controller may clear a value of the first bit error rate to zero, that is, the controller clears the bit error rate of the first egress port to zero. In this case, the bit error rate of the first egress port is ignored. If the first bit error rate is greater than the second bit error rate threshold, the controller may skip clearing processing on the value of the first bit error rate, and update the bit error rate of the first egress port to the first bit error rate. In this case, the bit error rate of the first egress port is not ignored.

After the bit error rate of the first egress port is updated, the controller determines that the first egress port is an egress port that is on the first transmission path and that is configured to send data traffic, so that the first accumulated bit error rate of the first transmission path may be calculated by using the bit error rate of the first egress port.

The first accumulated bit error rate is a weighted sum of bit error rates of all egress ports configured to send data traffic on the first transmission path. For example, in the network structure example shown in FIG. 1, it is assumed that the first transmission path is a path from the CSG 103 to the core network device 102, and the first transmission path passes through the CSG 103, the CSG 104, the ASG 106, and the RSG 108. In this case, egress ports configured to send data traffic on the first transmission path include the egress port 111 used by the CSG 103 to send data traffic to the CSG 104, the egress port 113 used by the CSG 104 to send data traffic to the ASG 106, and the egress port 116 used by the ASG 106 to send data traffic to the RSG 108. The first accumulated bit error rate of the first transmission path is a sum of a bit error rate of the egress port 111, a bit error rate of the egress port 113, and a bit error rate of the egress port 116.

In an example, when the controller receives the first link status information sent by the first network device, the controller may update the bit error rate of the first egress port to the first bit error rate, and record the first bit error rate. When the first accumulated bit error rate of the first transmission path needs to be calculated, the controller may obtain, from the record, bit error rates of all egress ports on the first transmission path including the bit error rate of the first egress port, and calculate a weighted sum, to obtain the first accumulated bit error rate of the first transmission path. In a specific example, it is assumed that a transmission path A includes an egress port A and an egress port B, and a bit error rate A of the egress port A and a bit error rate B of the egress port B have been reported to the controller. The controller records the bit error rate A of the egress port A and the bit error rate B of the egress port B. In this case, if an accumulated bit error rate of the transmission path A needs to be calculated, the controller may calculate a weighted sum of the bit error rate A and the bit error rate B as the accumulated bit error rate of the transmission path A.

In another example, it is assumed that the controller has calculated and recorded a fourth accumulated bit error rate of the first transmission path before receiving the first link status information. The fourth accumulated bit error rate is calculated by using a fourth bit error rate that is of the first egress port and that is recorded by the controller before the controller receives the first link status information. When the controller receives the first link status information sent by the first network device, the controller may update the fourth accumulated bit error rate of the first transmission path based on the first bit error rate, so that the fourth bit error rate of the first egress port in the fourth accumulated bit error rate is replaced with the first bit error rate, to obtain and record the first accumulated bit error rate of the first transmission path. In a specific example, it is assumed that a transmission path A includes an egress port A and an egress port B. In a case in which neither a bit error rate of the egress port A nor a bit error rate of the egress port B is reported to the controller, both the bit error rate of the egress port A and the bit error rate of the egress port B are considered as zero, and the controller may record an accumulated bit error rate A of the transmission path A as zero. After that, if a bit error rate A of the egress port A is reported to the controller, because the bit error rate of the egress port A in the accumulated bit error rate A is zero, the controller may add a weighted value of the bit error rate A to the accumulated bit error rate A, to obtain an accumulated bit error rate B and record as an accumulated bit error rate of the transmission path A, that is, the accumulated bit error rate B is the weighted value of the bit error rate A. After that, if a bit error rate B of the egress port B is reported to the controller, because the bit error rate of the egress port B in the accumulated bit error rate B is zero, the controller may add a weighted value of the bit error rate B to the accumulated bit error rate B, to obtain an accumulated bit error rate C and record as an accumulated bit error rate of the transmission path A, that is, the accumulated bit error rate C is a weighted sum of the bit error rate A and the bit error rate B. After that, if a bit error rate C of the egress port A is also reported to the controller, because the bit error rate of the egress port A in the accumulated bit error rate C is the bit error rate A, the controller may replace the weighted value of the bit error rate A in the accumulated bit error rate A with a weighted value of the bit error rate C, to obtain an accumulated bit error rate D and record as an accumulated bit error rate of the transmission path A, that is, the accumulated bit error rate D is a weighted sum of the bit error rate C and the bit error rate B.

203: The controller determines whether the first accumulated bit error rate is greater than a first bit error rate threshold.

204: The controller switches a service flow from the first transmission path to a second transmission path when the controller determines that the first accumulated bit error rate is greater than the first bit error rate threshold. A head node network device of the first transmission path and a head node network device of the second transmission path are a same network device, and a tail node network device of the first transmission path and a tail node network device of the second transmission path are a same network device.

The first bit error rate threshold is used to determine whether an accumulated bit error rate of a transmission path exceeds an acceptable degree. When the first accumulated bit error rate is less than the first bit error rate threshold, the first accumulated bit error rate is at an acceptable level, that is, a bit error generated by the service flow on the first transmission path is acceptable. In this case, the controller may not perform a transmission path switching operation on the service flow transmitted on the first transmission path. When the first accumulated bit error rate is greater than the first bit error rate threshold, the first accumulated bit error rate is at an unacceptable level, that is, a bit error generated by the service flow on the first transmission path is unacceptable. In this case, the controller may switch the service flow transmitted on the first transmission path to the second transmission path for transmission. The first transmission path and the second transmission path are two different transmission paths between a same head node network device and a same tail node network device. The first transmission path and the second transmission path may be, for example, segment routing-traffic engineering (SR-TE) tunnels.

In some embodiments, considering that different service types usually have different requirements on bit error rates generated during service flow transmission, the controller may correspondingly set different first bit error rate thresholds for the different service types. In this case, the controller may select different first bit error rate thresholds based on the different service types, to determine an accumulated bit error rate of a transmission path that is configured to transmit a service flow of a service type, to determine whether the service flow of the service type needs to be switched to another transmission path. In some embodiments, the controller may determine a service flow transmitted on the first transmission path and a service type of the service flow. If the first accumulated bit error rate of the first transmission path is greater than the first bit error rate threshold that is set corresponding to the service type, the controller may switch the service flow to the second transmission path for transmission. During actual application, a voice service is insensitive to a bit error rate compared with a data service. Therefore, a first bit error rate threshold that is set corresponding to the voice service may be greater than a first bit error rate threshold that is set corresponding to the data service. For example, because the voice service is affected when the bit error rate exceeds 4E-2, the first bit error rate threshold that is set corresponding to the voice service may be 4E-2. For another example, because a video service is affected when a bit error rate exceeds 1E-5, a first bit error rate threshold that is set corresponding to the video service may be 1E-5. For another example, because the data service is affected when the bit error rate exceeds 1E-6, the first bit error rate threshold that is set corresponding to the data service may be 1E-6.

It may be understood that the first bit error rate threshold is used to determine whether an accumulated bit error rate of a transmission path exceeds a requirement on a bit error rate of a service flow for transmission. The foregoing second bit error rate threshold is used to determine whether a bit error rate of a single egress port on the transmission path can be ignored. Therefore, the first bit error rate threshold is generally greater than the second bit error rate threshold.

It should be noted that switching the service flow from the first transmission path to the second transmission path is to switch the service flow from a transmission path with a relatively high accumulated bit error rate to a transmission path with a relatively low accumulated bit error rate. Therefore, in some embodiments, the controller may switch the service flow from the first transmission path to the second transmission path when determining that the first accumulated bit error rate of the first transmission path is greater than the first bit error rate threshold and that the second accumulated bit error rate of the second transmission path is less than the first bit error rate threshold. That is, step 204 may be specifically: The controller switches the service flow from the first transmission path to the second transmission path when the controller determines that the first accumulated bit error rate is greater than the first bit error rate threshold and the second accumulated bit error rate is less than the first bit error rate threshold. In addition, when the controller determines that both the first accumulated bit error rate and the second accumulated bit error rate are greater than the first bit error rate threshold, the controller may not switch the service flow from the first transmission path to the second transmission path.

The controller may determine the second accumulated bit error rate of the second transmission path in the following manner: The controller receives second link status information sent by a second network device, and determines a second accumulated bit error rate of the second transmission path based on the second link status information. The second link status information includes second egress port information and a second bit error rate, the second egress port information indicates a second egress port of the second network device, the second network device is configured to send data traffic to a next-hop network device of the second network device along the second transmission path through the second egress port, the second bit error rate indicates a bit error rate at which data traffic is sent through the second egress port, and the second accumulated bit error rate is a weighted sum of bit error rates of all egress ports configured to send data traffic on the second transmission path. It may be understood that, for the manner of determining the second accumulated bit error rate, refer to related descriptions of the first accumulated bit error rate. For an embodiment of an example implementation related to the second link status information, refer to related descriptions of the first link status information. Details are not described herein again.

In some cases, there are a plurality of other transmission paths between the head node network device and the tail node network device on the first transmission path different from the first transmission path. Therefore, in some embodiments, when the controller determines that the first accumulated bit error rate of the first transmission path is greater than the first bit error rate threshold, the controller may determine the second transmission path from the plurality of other paths based on performance of each of the plurality of transmission paths, to switch the service flow from the first transmission path to the second transmission path. In this way, the service flow may be switched to a transmission path with better performance, and therefore, transmission efficiency of the service flow is higher.

In an example, the performance used to determine the second transmission path from the other transmission paths may be an accumulated bit error rate. In other words, the controller may determine the second transmission path from the other transmission paths based on an accumulated bit error rate of each of the other transmission paths. The second transmission path may be a transmission path with a minimum accumulated bit error rate in the other transmission paths.

In another example, the performance used to determine the second transmission path from the other transmission paths may be link cost (COST). In other words, the controller may determine the second transmission path from the other transmission paths based on a COST value of each of the other transmission paths. The second transmission path may be a transmission path with a minimum COST value in the other transmission paths.

In still another example, the performance used to determine the second transmission path from the other transmission paths may be bandwidth. In other words, the controller may determine the second transmission path from the other transmission paths based on bandwidth of each of the other transmission paths. The second transmission path may be a transmission path with maximum bandwidth in the other transmission paths.

In still another example, the performance used to determine the second transmission path from the other transmission paths may be a delay. In other words, the controller may determine the second transmission path from the other transmission paths based on a delay of each of the other transmission paths. The second transmission path may be a transmission path with a minimum delay in the other transmission paths.

In addition, the performance used to determine the second transmission path from the other transmission paths may be any combination of a plurality of types of performance including an accumulated bit error rate, a COST value, bandwidth, and a delay.

To switch the service flow from the first transmission path to the second transmission path, the controller may generate a label stack used to indicate to transmit the service flow on the second transmission path, and use a path computation element communication protocol (PCEP) packet to send the label stack to the head node network device of the second transmission path. The head node network device may encapsulate the label stack of the service flow into a packet of the service flow. In this way, each network device on the second transmission path can send the packet of the service flow to a next-hop network device of the network device based on the label stack encapsulated in the packet of the service flow.

In some embodiments, if the first transmission path is a primary path of the service flow, and the second transmission path is a secondary path of the service flow, after the service flow is switched from the first transmission path to the second transmission path, when a bit error rate of an egress port on the first transmission path decreases to enable the accumulated bit error rate of the first transmission path to decrease below the first bit error rate threshold, the service flow may further be switched from the second transmission path back to the first transmission path. In some embodiments, after step 204, the controller may further receive third link status information sent by a third network device, determine a third accumulated bit error rate of the first transmission path based on the third link status information, and switch the service flow from the second transmission path back to the first transmission path when determining that the third accumulated bit error rate is less than the first bit error rate threshold. The third link status information includes third egress port information and a third bit error rate, the third egress port information indicates a third egress port of the third network device, the third network device is configured to send data traffic to a next-hop network device of the third network device along the first transmission path through the third egress port, the third bit error rate indicates a bit error rate at which data traffic is sent through the third egress port, and the third accumulated bit error rate is a weighted sum of bit error rates of all the egress ports configured to send data traffic on the first transmission path. It should be noted that the third egress port may be the foregoing first egress port, or may be any another egress port other than the first egress port on the first transmission path. It may be understood that, for a manner of determining the third accumulated bit error rate, refer to related descriptions of the first accumulated bit error rate. For an embodiment of an example implementation related to the third link status information, refer to related descriptions of the first link status information. Details are not described herein again.

In addition, in some embodiments, after the service flow is switched from the first transmission path to the second transmission path, if the accumulated bit error rate of the first transmission path is always above the first bit error rate threshold and the accumulated bit error rate of the second transmission path also exceeds the first bit error rate threshold, the service flow may continue to be transmitted on the second transmission path, but does not need to be switched back to the first transmission path.

In this embodiment, in the manner of reporting by the network device, the controller may collect and accumulate the bit error rates at which data traffic is sent through all egress ports on the first transmission path, so that the controller may switch the service flow on the first transmission path to the second transmission path when a bit error rate obtained through accumulation is excessively high. Therefore, the controller may switch a service flow transmitted on a transmission path with an excessively high accumulated bit error rate to another transmission path with a relatively low accumulated bit error rate for transmission. This can avoid using a multi-hop path with a severe accumulated bit error rate to forward a service flow, and improve transmission stability of the service flow.

Figure 6:
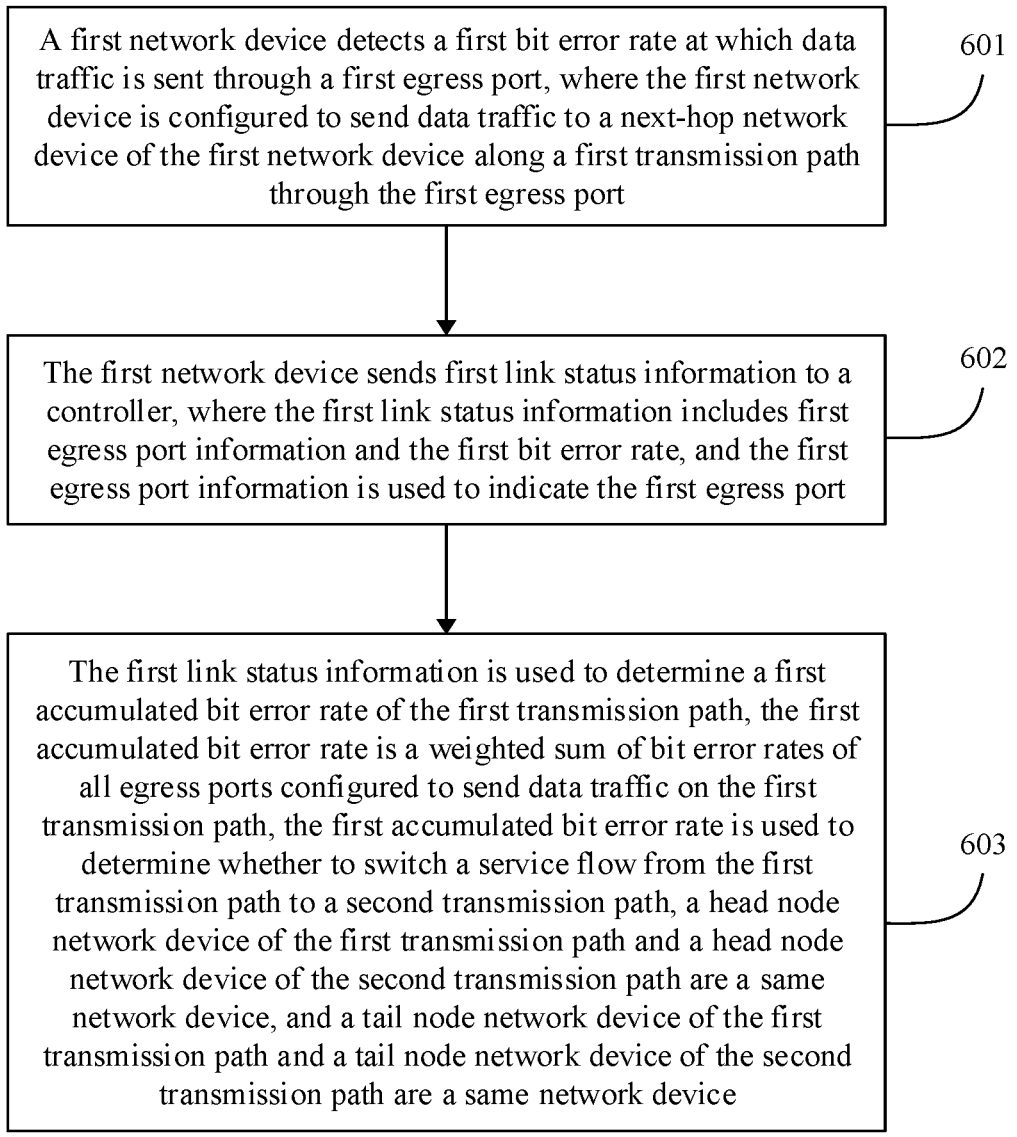
FIG. 6 is a schematic flowchart of a link bit error-based processing method 600 according to an embodiment of this application.

FIG. 6 is a schematic flowchart of a link bit error-based processing method 600 according to an embodiment of this application. The method 600 may include the following steps.

601: A first network device detects a first bit error rate at which data traffic is sent through a first egress port. The first network device is configured to send data traffic to a next-hop network device of the first network device along a first transmission path through the first egress port.

602: The first network device sends first link status information to a controller. The first link status information includes first egress port information and the first bit error rate, and the first egress port information is used to indicate the first egress port.

603: The first link status information is used to determine a first accumulated bit error rate of the first transmission path, the first accumulated bit error rate is a weighted sum of bit error rates of all egress ports configured to send data traffic on the first transmission path, the first accumulated bit error rate is used to determine whether to switch a service flow from the first transmission path to a second transmission path, a head node network device of the first transmission path and a head node network device of the second transmission path are a same network device, and a tail node network device of the first transmission path and a tail node network device of the second transmission path are a same network device.

In some possible embodiments, the first link status information is sent to the controller by using a BGP update packet.

In some possible embodiments, the first link status information is specifically carried in a multiprotocol reachable network layer reachability information (MP REACH NLRI) field or a multiprotocol unreachable network layer reachability information (MP UNREACH NLRI) field in the BGP update packet.

In some possible embodiments, the first link status information in the BGP update packet is carried in type-length-value TLV information.

In some possible embodiments, the first link status information is directly sent by the first network device to the controller.

In some possible embodiments, the first link status information is first sent by the first network device to a third network device, and then is directly sent by the third network device to the controller.

In an example, the first network device mentioned in the method 600 may be the first network device mentioned in the method 200, and the first link status information mentioned in the method 600 may be the first link status information mentioned in the method 200. In another example, the first network device mentioned in the method 600 may be the second network device mentioned in the method 200, and the first link status information mentioned in the method 600 may be the second link status information mentioned in the method 200. In still another example, the first network device mentioned in the method 600 may be the second network device mentioned in the method 200, and the first link status information mentioned in the method 600 may be the second link status information mentioned in the method 200. Therefore, for various embodiments of example implementations of the first link status information in the method 600, refer to related descriptions of the method 200. Details are not described herein again.

In a possible embodiment, the method further includes:

The first network device receives second link status information sent by a second network device. The second link status information includes second egress port information and a second bit error rate, the second egress port information indicates a second egress port of the second network device, the second network device is configured to send data traffic to a next-hop network device of the second network device along a third transmission path through the second egress port, and the second bit error rate indicates a bit error rate at which data traffic is sent through the second egress port.

The first network device sends the second link status information to the controller.

The second link status information is used to determine a second accumulated bit error rate of the third transmission path. The second accumulated bit error rate is a weighted sum of bit error rates of all egress ports configured to send data traffic on the third transmission path, the second accumulated bit error rate is used to determine whether to switch a service flow from the third transmission path to a fourth transmission path, a head node network device of the third transmission path and a head node network device of the fourth transmission path are a same network device, and a tail node network device of the third transmission path and a tail node network device of the fourth transmission path are a same network device.

In this embodiment, the first network device mentioned in the method 600 may be the fourth network device mentioned in the method 200, and the second link status information mentioned in the method 600 may be the first link status information mentioned in the method 200. Therefore, for various embodiments of the second link status information in the method 600, refer to related descriptions of the method 200. Details are not described herein again.

In this embodiment, a network device may report a bit error rate of an egress port to the controller. In this way, the controller may collect and accumulate bit error rates at which data traffic is sent through all egress ports on the first transmission path, so that the controller may switch the service flow on the first transmission path to the second transmission path when a bit error rate obtained through accumulation is excessively high. Therefore, a service flow transmitted on a transmission path with an excessively high accumulated bit error rate may be switched to another transmission path with a relatively low accumulated bit error rate for transmission. This avoids using a multi-hop path with a severe accumulated bit error rate to forward a service flow, and improves transmission stability of the service flow.

Figure 7:
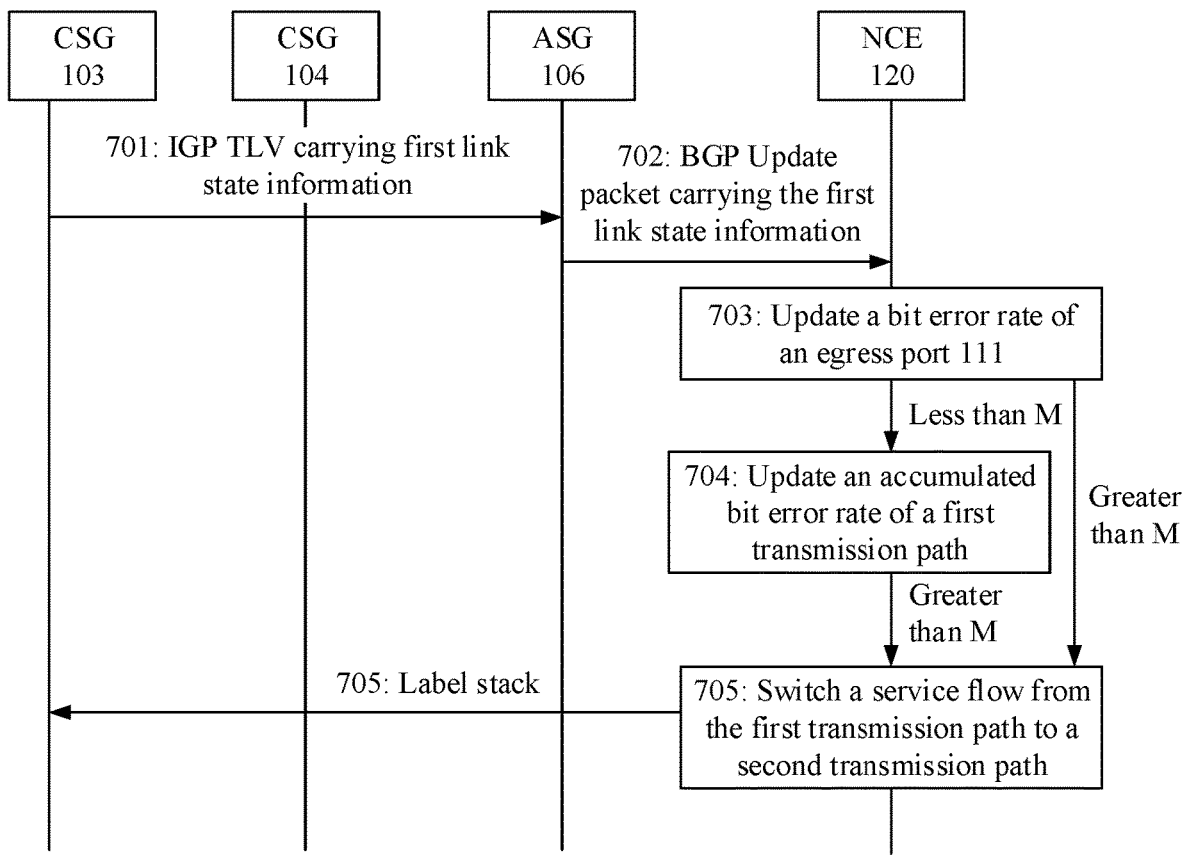
FIG. 7 is a schematic flowchart of a link bit error-based processing method 700 according to an embodiment of this application.

The following describes an application example of this embodiment of this application in a specific scenario by using a specific scenario example. The specific scenario example may use a network structure shown in FIG. 1. The first transmission path and the second transmission path are two transmission paths respectively from the CSG 103 to the RSG 108. The first transmission path passes through the CSG 103, the CSG 104, the ASG 106, and the RSG 108. The second transmission path passes through the CSG 103, the CSG 105, the ASG 107, the RSG 109, and the RSG 108. In the specific scenario example, as shown in FIG. 7, a link bit error-based processing method 700 may include, for example, the following steps:

701: The CSG 103 sends first link status information to the ASG 106.

The first link status information includes egress port information that is used to indicate the egress port 111 and a bit error rate a1. a1 is a bit error rate that is detected by the CSG 103 and at which the egress port 111 is configured to send data traffic. Link status information may be specifically carried in TLV information of the IGP protocol, and sent by the CSG 103 to the ASG 106.

It may be understood that this embodiment is described by using an example in which the CSG 103 reports the bit error rate of the egress port 111. Actually, any network device on the network 110 may report a bit error rate of any egress port on the network device.

702: The ASG 106 sends the first link status information to the NCE 120.

The first link status information may be carried in an MP REACH NLRI or MP UNREACH NLRI field of a BGP update packet, and sent by the ASG 106 to the NCE 120.

703: The NCE 120 updates the bit error rate of the egress port 111 based on the first link status information.

The NCE 120 may update the bit error rate of the egress port 111 according to a size relationship between a1 and a second bit error rate threshold N. If a1 is less than N, the NCE 120 may update the bit error rate of the egress port 111 to zero. If a1 is greater than N, the NCE 120 may update the bit error rate of the egress port 111 to a1.

After the bit error rate of the egress port 111 is updated, if the bit error rate of the egress port 111 is greater than a first bit error rate threshold M, step 705 is performed; or if the bit error rate of the egress port 111 is less than a first bit error rate threshold M, step 704 is performed. M is greater than N.

704: The NCE 120 updates an accumulated bit error rate of the first transmission path based on the bit error rate of the egress port 111.

Before the bit error rate of the egress port 111 is updated, the accumulated bit error rate of the first transmission path is $q0=a0+b0+c0$. $a0$ is a bit error rate that is of the egress port 111 and that is reported by the CSG 103 before the first link status information is reported, or $a0$ is 0 if the CSG 103 has not reported the bit error rate of the egress port 111 before the first link status information is reported. $b0$ is a bit error rate that is of the egress port 113 and that is reported by the CSG 104 before the first link status information is reported, or $b0$ is 0 if the CSG 104 has not reported the bit error rate of the port 113 before the first link status information is reported. $c0$ is a bit error rate that is of the egress port 116 and that is reported by the ASG 106 before the first link status information is reported, or $c0$ is 0 if the ASG 106 has not reported the bit error rate of the port 116 before the first link status information is reported. If the bit error rate of the egress port 111 is updated to a1, the accumulated bit error rate of the first transmission path is updated to $q1=a1+b0+c0$. If the bit error rate of the egress port 111 is updated to zero, the accumulated bit error rate of the first transmission path is updated to $q2=0+b0+c0$.

After the accumulated bit error rate of the first transmission path is updated, if the accumulated bit error rate of the first transmission path is greater than M, step 705 is performed; or if the accumulated bit error rate of the first transmission path is less than M, a subsequent path switching operation may not be performed.

705: The NCE 120 switches a service flow from the first transmission path to the second transmission path.

In some embodiments, the NCE 120 may determine a service flow transmitted on the first transmission path, generate a label stack used to indicate to transmit the service flow on the second transmission path, and send the label stack to the CSG 103 by using the RSG 108. The label stack includes labels used to indicate the CSG 103, the CSG 105, the ASG 107, the RSG 109, and the RSG 108. After receiving the label stack, the CSG 103 may encapsulate the label stack into a packet of the service flow. In this case, the CSG 103, the CSG 105, the ASG 107, the RSG 109, and the RSG 108 may separately send the packet of the service flow to their next-hop network devices on the second transmission path based on the label stack. Therefore, the packet of the service flow is transmitted on the second transmission path.

In this embodiment, any network device on the network 110 may report a bit error rate of any egress port on the network device to the NCE 120. In this case, the NCE 120 may collect and accumulate the bit error rates of the egress port 111, the egress port 113, and the egress port 116, to obtain the accumulated bit error of the first transmission path, so that the NCE 120 may switch the service flow on the first transmission path to the second transmission path when the accumulated bit error rate of the first transmission path is excessively high. Therefore, a service flow transmitted on a transmission path with an excessively high accumulated bit error rate may be switched to another transmission path with a relatively low accumulated bit error rate for transmission. This avoids using a multi-hop path with a severe accumulated bit error rate to forward a service flow, and improves transmission stability of the service flow.

Figure 8:
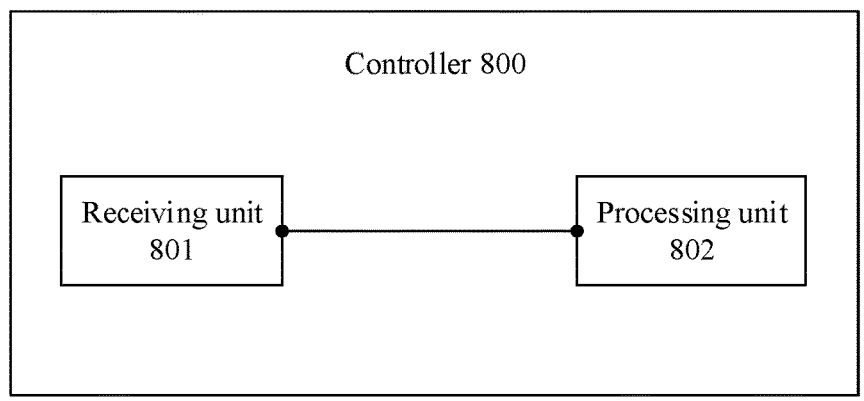
FIG. 8 is a schematic diagram of a structure of a link bit error-based processing apparatus according to an embodiment of this application.

FIG. 8 is a schematic diagram of a structure of a link bit error-based processing apparatus according to an embodiment of this application. The apparatus is a controller 800, and may specifically include a receiving unit 801 and a processing unit 802. The receiving unit 801 is configured to receive first link status information sent by a first network device. The first link status information includes first egress port information and a first bit error rate, the first egress port information indicates a first egress port of the first network device, the first network device is configured to send data traffic to a next-hop network device of the first network device along a first transmission path through the first egress port, and the first bit error rate indicates a bit error rate at which data traffic is sent through the first egress port. The processing unit 802 is configured to: determine a first accumulated bit error rate of the first transmission path based on the first link status information, determine whether the first accumulated bit error rate is greater than a first bit error rate threshold, and switch a service flow from the first transmission path to a second transmission path when determining that the first accumulated bit error rate is greater than the first bit error rate threshold. The first accumulated bit error rate is a weighted sum of bit error rates of all egress ports configured to send data traffic on the first transmission path, a head node network device of the first transmission path and a head node network device of the second transmission path are a same network device, and a tail node network device of the first transmission path and a tail node network device of the second transmission path are a same network device.

In some embodiments, the processing unit 802 is further configured to clear a value of the first bit error rate to zero when the first bit error rate is less than a second bit error rate threshold. The first bit error rate threshold is greater than the second bit error rate threshold.

In some embodiments, the receiving unit 801 is further configured to receive second link status information sent by a second network device. The second link status information includes second egress port information and a second bit error rate, the second egress port information indicates a second egress port of the second network device, the second network device is configured to send data traffic to a next-hop network device of the second network device along the second transmission path through the second egress port, and the second bit error rate indicates a bit error rate at which data traffic is sent through the second egress port. The processing unit 802 is further configured to determine a second accumulated bit error rate of the second transmission path based on the second link status information, determine whether the second accumulated bit error rate is less than the first bit error rate threshold, and switch the service flow from the first transmission path to the second transmission path when determining that the first accumulated bit error rate is greater than the first bit error rate threshold and the second accumulated bit error rate is less than the first bit error rate threshold. The second accumulated bit error rate is a weighted sum of bit error rates of all egress ports configured to send data traffic on the second transmission path.

In some embodiments, the processing unit 802 is further configured to: before switching the service flow from the first transmission path to the second transmission path, obtain another transmission path between the head node network device of the first transmission path and the tail node network device of the first transmission path that is different from the first transmission path, and determine the second transmission path from the another transmission path based on an accumulated bit error rate of each of the another transmission path.

In some embodiments, the receiving unit 801 is further configured to: after the service flow is switched from the first transmission path to the second transmission path, receive third link status information sent by a third network device. The third link status information includes third egress port information and a third bit error rate, the third egress port information indicates a third egress port of the third network device, the third network device is configured to send data traffic to a next-hop network device of the third network device along the first transmission path through the third egress port, and the third bit error rate indicates a bit error rate at which data traffic is sent through the third egress port. The processing unit 802 is further configured to: determine a third accumulated bit error rate of the first transmission path based on the third link status information, determine whether the third accumulated bit error rate is less than the first bit error rate threshold, and switch the service flow from the second transmission path back to the first transmission path when determining that the third accumulated bit error rate is less than the first bit error rate threshold. The third accumulated bit error rate is a weighted sum of bit error rates of all the egress ports configured to send data traffic on the first transmission path.

In some embodiments, the receiving unit 801 is further configured to receive a border gateway protocol (BGP) update packet, where the BGP update packet carries the first link status information sent by the first network device. The processing unit 802 is further configured to obtain the first link status information from the BGP update packet.

In some embodiments, the first link status information is specifically carried in a multiprotocol reachable network layer reachability information (MP REACH NLRI) field or a multiprotocol unreachable network layer reachability information (MP UNREACH NLRI) field in the BGP update packet.

In some embodiments, the first link status information in the BGP update packet is carried in type-length-value TLV information.

In some embodiments, the first link status information is directly sent by the first network device to the controller; or the first link status information is first sent by the first network device to a fourth network device, and then is directly sent by the fourth network device to the controller.

In some embodiments, the first bit error rate threshold is specifically a bit error rate threshold that is set corresponding to a service type of the service flow.

It may be understood that the controller 800 is the controller mentioned in the method 200. Therefore, for various specific embodiment implementations of the controller 800, refer to the description of the controller in the method 200. Details are not described in this embodiment again.

Figure 9:
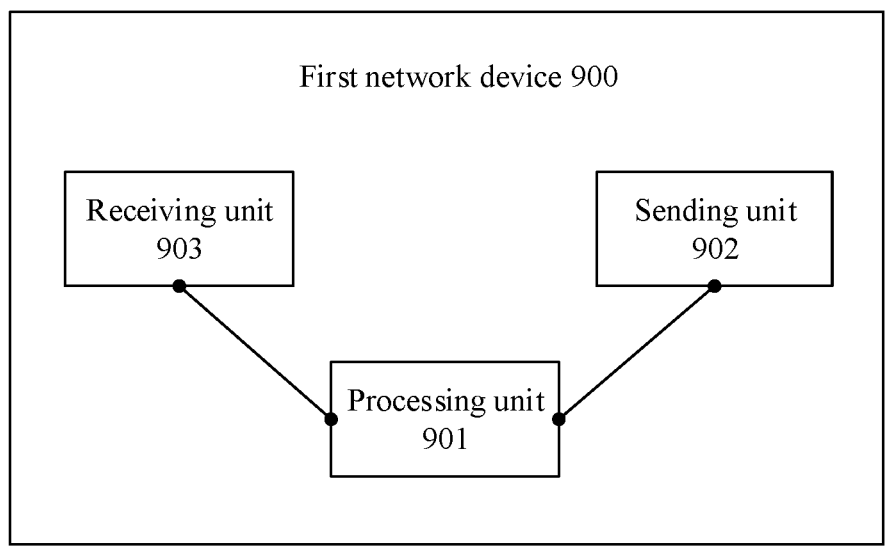
FIG. 9 is a schematic diagram of a structure of a link bit error-based processing apparatus according to an embodiment of this application.

FIG. 9 is a schematic diagram of a structure of a link bit error-based processing apparatus according to an embodiment of this application. The apparatus is a first network device 900, and may specifically include a processing unit 901 and a sending unit 902. The processing unit 901 is configured to detect a first bit error rate at which data traffic is sent through a first egress port. The first network device is configured to send data traffic to a next-hop network device of the first network device along a first transmission path through the first egress port. The sending unit 902 is configured to send first link status information to a controller. The first link status information includes first egress port information and the first bit error rate, and the first egress port information is used to indicate the first egress port. The first link status information is used to determine a first accumulated bit error rate of the first transmission path, the first accumulated bit error rate is a weighted sum of bit error rates of all egress ports configured to send data traffic on the first transmission path, the first accumulated bit error rate is used to determine whether to switch a service flow from the first transmission path to a second transmission path, a head node network device of the first transmission path and a head node network device of the second transmission path are a same network device, and a tail node network device of the first transmission path and a tail node network device of the second transmission path are a same network device.

In some embodiments, the first link status information is sent to the controller by using a BGP update packet.

In some embodiments, the first link status information is specifically carried in a multiprotocol reachable network layer reachability information (MP REACH NLRI) field or a multiprotocol unreachable network layer reachability information (MP UNREACH NLRI) field in the BGP update packet.

In some embodiments, the first link status information in the BGP update packet is carried in type-length-value (TLV) information.

In some embodiments, the first link status information is directly sent by the first network device to the controller.

In some embodiments, the first network device 900 further includes a receiving unit 903. The receiving unit 903 is configured to receive second link status information sent by a second network device. The second link status information includes second egress port information and a second bit error rate, the second egress port information indicates a second egress port of the second network device, the second network device is configured to send data traffic to a next-hop network device of the second network device along a third transmission path through the second egress port, and the second bit error rate indicates a bit error rate at which data traffic is sent through the second egress port. The sending unit is further configured to send the second link status information to the controller. The second link status information is used to determine a second accumulated bit error rate of the third transmission path. The second accumulated bit error rate is a weighted sum of bit error rates of all egress ports configured to send data traffic on the third transmission path, the second accumulated bit error rate is used to determine whether to switch a service flow from the third transmission path to a fourth transmission path, a head node network device of the third transmission path and a head node network device of the fourth transmission path are a same network device, and a tail node network device of the third transmission path and a tail node network device of the fourth transmission path are a same network device.

In some embodiments, the first link status information is first sent by the first network device to a third network device, and then is directly sent by the third network device to the controller.

It may be understood that the first network device 900 is the first network device mentioned in the method 200. Therefore, for various specific embodiment implementations of the first network device 900, refer to the description of the first network device in the method 200. Details are not described in this embodiment again.

In addition, an embodiment of this application further provides a controller. The controller includes a processor and a memory. The memory stores instructions. When the processor executes the instructions, the controller is enabled to perform the foregoing method 200.

In addition, an embodiment of this application further provides a network device. The network device includes a processor and a memory. The memory stores instructions. When the processor executes the instructions, the network device is enabled to perform the foregoing method 600.

In addition, an embodiment of this application further provides a computer program product. When the computer program product is run on a computer, the computer is enabled to perform the foregoing method 200 or the foregoing method 600.

In addition, an embodiment of this application further provides a computer-readable storage medium. The computer-readable storage medium stores instructions. When the instructions are run on a computer or a processor, the computer or the processor is enabled to perform the foregoing method 200 or the foregoing method 600.

The "first" in the names such as the "first network device", "first link status information", "first egress port", "first bit error rate", "first transmission path", and "first accumulated bit error rate" mentioned in the embodiments of this application is merely used as a name identifier, but does not indicate the first in order. This rule is also applicable to the "second", and the like.

It can be learned from the foregoing descriptions of the embodiment sand example implementations that, a person skilled in the art may clearly understand that a part or all of the steps of the methods in the foregoing embodiments may be implemented by using software and a universal hardware platform. Based on such an understanding, the technical solutions of this application may be implemented in a form of a software product. The computer software product may be stored in a storage medium, for example, a read-only memory (ROM)/random access memory (RAM), a magnetic disk, or an optical disc, and include several instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, the apparatus embodiment is basically similar to the method embodiment, and therefore is described briefly.

For related parts, refer to partial descriptions in the method embodiment. The described device and method embodiments are merely examples. The modules described as separate parts may or may not be physically separate, and parts displayed as modules may or may not be physical modules, may be located in one position, or may be distributed on a plurality of network units. A part or all of the modules may be selected based on actual requirements to achieve the objectives of the solutions of the embodiments. A person of ordinary skill in the art may understand and implement the embodiments without creative efforts.

The foregoing descriptions are merely example embodiment and implementations of this application, but are not intended to limit the protection scope of this application.

What is claimed is:

1. A link bit error-based processing method, comprising:
receiving, by a controller, first link status information sent by a first network device, wherein the first link status information comprises first egress port information and a first bit error rate, the first egress port information indicates a first egress port of the first network device, the first network device is configured to send data traffic to a next-hop network device of the first network device along a first transmission path through the first egress port, and the first bit error rate indicates a bit error rate at which data traffic is sent through the first egress port;
determining, by the controller, a first accumulated bit error rate of the first transmission path based on the first link status information, wherein the first accumulated bit error rate is a weighted sum of bit error rates of all egress ports configured to send data traffic on the first transmission path;
determining, by the controller, whether the first accumulated bit error rate is greater than a first bit error rate threshold; and
switching, by the controller, a service flow from the first transmission path to a second transmission path when the controller determines that the first accumulated bit error rate is greater than the first bit error rate threshold, wherein a head node network device of the first transmission path and a head node network device of the second transmission path are a same network device, and a tail node network device of the first transmission path and a tail node network device of the second transmission path are a same network device, and
wherein the first bit error rate threshold is a bit error rate threshold that is set corresponding to a service type of the service flow, while maintaining a service path for flows that exceed the first bit error rate threshold.

2. The method according to claim 1, wherein the determining, by the controller, the first accumulated bit error rate of the first transmission path based on the first link status information comprises:
clearing, by the controller, a value of the first bit error rate to zero when the first bit error rate is less than a second bit error rate threshold, wherein
the first bit error rate threshold is greater than the second bit error rate threshold.

3. The method according to claim 1, wherein the method further comprises:
receiving, by the controller, second link status information sent by a second network device, wherein the second link status information comprises second egress port information and a second bit error rate, the second egress port information indicates a second egress port of the second network device, the second network device is configured to send data traffic to a next-hop network device of the second network device along the second transmission path through the second egress port, and the second bit error rate indicates a bit error rate at which data traffic is sent through the second egress port;
determining, by the controller, a second accumulated bit error rate of the second transmission path based on the second link status information, wherein the second accumulated bit error rate is a weighted sum of bit error rates of all egress ports configured to send data traffic on the second transmission path;
determining, by the controller, whether the second accumulated bit error rate is less than the first bit error rate threshold; and
switching, by the controller, the service flow from the first transmission path to the second transmission path when the controller determines that the first accumulated bit error rate is greater than the first bit error rate threshold and the second accumulated bit error rate is less than the first bit error rate threshold.

4. The method according to claim 1, wherein before the switching, by the controller, the service flow from the first transmission path to the second transmission path, the method further comprises:
obtaining, by the controller, another transmission path between the head node network device of the first transmission path and the tail node network device of the first transmission path that is different from the first transmission path; and
determining, by the controller, the second transmission path from the another transmission path based on an accumulated bit error rate of each of the another transmission path.

5. The method according to claim 1, wherein after the switching, by the controller, the service flow from the first transmission path to the second transmission path, the method further comprises:
receiving, by the controller, third link status information sent by a third network device, wherein the third link status information comprises third egress port information and a third bit error rate, the third egress port information indicates a third egress port of the third network device, the third network device is configured to send data traffic to a next-hop network device of the third network device along the first transmission path through the third egress port, and the third bit error rate indicates a bit error rate at which data traffic is sent through the third egress port;
determining, by the controller, a third accumulated bit error rate of the first transmission path based on the third link status information, wherein the third accumulated bit error rate is a weighted sum of bit error rates of all the egress ports configured to send data traffic on the first transmission path;
determining, by the controller, whether the third accumulated bit error rate is less than the first bit error rate threshold; and
switching, by the controller, the service flow from the second transmission path back to the first transmission path when the controller determines that the third accumulated bit error rate is less than the third bit error rate threshold.

6. The method according to claim 1, wherein the receiving, by the controller, first link status information sent by the first network device comprises:

receiving, by the controller, a border gateway protocol (BGP) update packet that carries the first link status information sent by the first network device; and obtaining, by the controller, the first link status information from the BGP update packet.

7. The method according to claim 6, wherein the first link status information is carried in a multiprotocol reachable network layer reachability information (MP REACH NLRI) field or a multiprotocol unreachable network layer reachability information (MP UNREACH NLRI) field in the BGP update packet.

8. The method according to claim 6, wherein the first link status information in the BGP update packet is carried in type-length-value (TLV) information.

9. The method according to claim 1, wherein the first link status information is sent by the first network device directly to the controller; or the first link status information is first sent by the first network device to a fourth network device, and then is sent by the fourth network device directly to the controller.

10. A link bit error-based processing apparatus, comprising:
a non-transitory memory storing instructions; and
a processor coupled to the non-transitory memory, the processor configured to execute the instructions to cause the apparatus to be configured to:
receive first link status information sent by a first network device, wherein the first link status information comprises first egress port information and a first bit error rate, the first egress port information indicates a first egress port of the first network device, the first network device is configured to send data traffic to a next-hop network device of the first network device along a first transmission path through the first egress port, and the first bit error rate indicates a bit error rate at which data traffic is sent through the first egress port,
determine a first accumulated bit error rate of the first transmission path based on the first link status information,
determine whether the first accumulated bit error rate is greater than a first bit error rate threshold, and
switch a service flow from the first transmission path to a second transmission path when determining that the first accumulated bit error rate is greater than the first bit error rate threshold, wherein
the first accumulated bit error rate is a weighted sum of bit error rates of all egress ports configured to send data traffic on the first transmission path, a head node network device of the first transmission path and a head node network device of the second transmission path are a same network device, and a tail node network device of the first transmission path and a tail node network device of the second transmission path are a same network device, and
wherein the first bit error rate threshold is a bit error rate threshold that is set corresponding to a service type of the service flow, while maintaining a service path for flows that exceed the first bit error rate threshold.

11. The apparatus according to claim 10, wherein the instructions, when executed by the processor, further cause the apparatus to be configured to:
clear a value of the first bit error rate to zero when the first bit error rate is less than a second bit error rate threshold, wherein the first bit error rate threshold is greater than the second bit error rate threshold.

12. The apparatus according to claim 10, wherein the instructions, when executed by the processor, further cause the apparatus to be configured to:
receive second link status information sent by a second network device, wherein the second link status information comprises second egress port information and a second bit error rate, the second egress port information indicates a second egress port of the second network device, the second network device is configured to send data traffic to a next-hop network device of the second network device along the second transmission path through the second egress port, and the second bit error rate indicates a bit error rate at which data traffic is sent through the second egress port;
determine a second accumulated bit error rate of the second transmission path based on the second link status information;
determine whether the second accumulated bit error rate is less than the first bit error rate threshold, and
switch the service flow from the first transmission path to the second transmission path when determining that the first accumulated bit error rate is greater than the first bit error rate threshold and the second accumulated bit error rate is less than the first bit error rate threshold, wherein the second accumulated bit error rate is a weighted sum of bit error rates of all egress ports configured to send data traffic on the second transmission path.

13. The apparatus according to claim 10, wherein the instructions, when executed by the processor, further cause the apparatus to be configured to:
before switching the service flow from the first transmission path to the second transmission path, obtain another transmission path between the head node network device of the first transmission path and the tail node network device of the first transmission path that is different from the first transmission path, and determine the second transmission path from the another transmission path based on an accumulated bit error rate of each of the another transmission path.

14. The apparatus according to claim 10, wherein the instructions, when executed by the processor, further cause the apparatus to be configured to:
after the service flow is switched from the first transmission path to the second transmission path, receive third link status information sent by a third network device, wherein the third link status information comprises third egress port information and a third bit error rate, the third egress port information indicates a third egress port of the third network device, the third network device is configured to send data traffic to a next-hop network device of the third network device along the first transmission path through the third egress port, and the third bit error rate indicates a bit error rate at which data traffic is sent through the third egress port; and
determine a third accumulated bit error rate of the first transmission path based on the third link status information, determine whether the third accumulated bit error rate is less than the first bit error rate threshold, and switch the service flow from the second transmission path back to the first transmission path when determining that the third accumulated bit error rate is less than the first bit error rate threshold, wherein
the third accumulated bit error rate is a weighted sum of bit error rates of all the egress ports configured to send data traffic on the first transmission path.

15. The apparatus according to claim 10, wherein the instructions, when executed by the processor, further cause the apparatus to be configured to:
- receive a border gateway protocol (BGP) update packet that carries the first link status information sent by the first network device; and
- obtain the first link status information from the BGP update packet.

16. A link bit error-based processing apparatus, comprising:
- a non-transitory memory storing instructions; and
- a processor coupled to the non-transitory memory, the processor configured to execute the instructions to cause the apparatus to be configured to:
  - detect a first bit error rate at which data traffic is sent through a first egress port of a first network device, wherein the first network device is configured to send the data traffic to a next-hop network device of the first network device along a first transmission path through the first egress port, and
  - send first link status information to a controller, wherein the first link status information comprises first egress port information and the first bit error rate, and the first egress port information indicates the first egress port, wherein
  - the first link status information is used to determine a first accumulated bit error rate of the first transmission path, the first accumulated bit error rate is a weighted sum of bit error rates of all egress ports configured to send data traffic on the first transmission path, the first accumulated bit error rate is used to determine whether the first accumulated bit error rate is greater than a first bit error rate threshold to switch a service flow from the first transmission path to a second transmission path, a head node network device of the first transmission path and a head node network device of the second transmission path are a same network device, and a tail node network device of the first transmission path and a tail node network device of the second transmission path are a same network device, and
  - wherein the first bit error rate threshold is a bit error rate threshold that is set corresponding to a service type of the service flow, while maintaining a service path for flows that exceed the first bit error rate threshold.

17. The apparatus according to claim 16, wherein the first link status information is sent to the controller using a border gateway protocol (BGP) update packet.

18. The apparatus according to claim 17, wherein the first link status information is carried in a multiprotocol reachable network layer reachability information (MP REACH NLRI) field or a multiprotocol unreachable network layer reachability information (MP UNREACH NLRI) field in the BGP update packet.

19. The apparatus according to claim 17, wherein the first link status information in the BGP update packet is carried in type-length-value (TLV) information.

* * * * *